July 1, 1958 W. W. PRUE 2,840,835
ROUGHING MACHINE
Filed Oct. 31, 1957
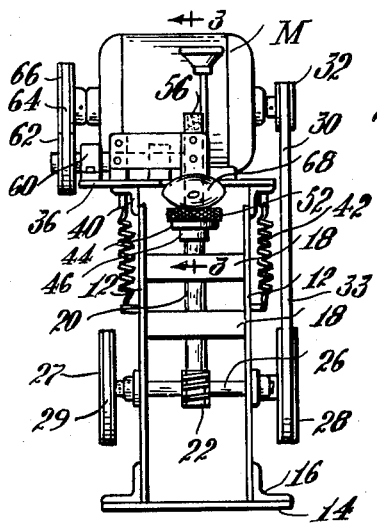
Fig. 1
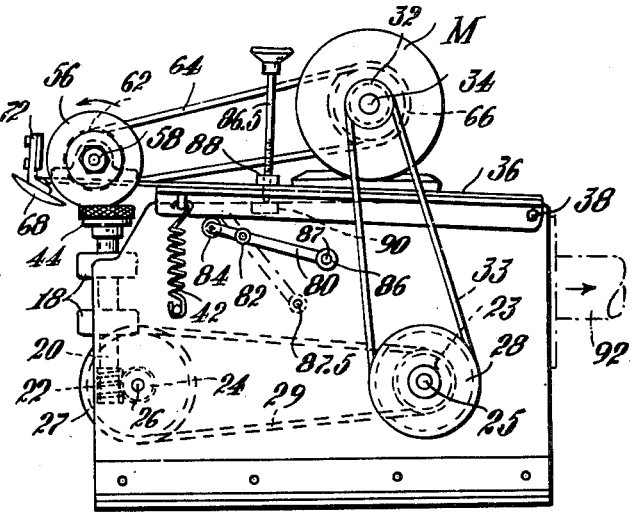
Fig. 2
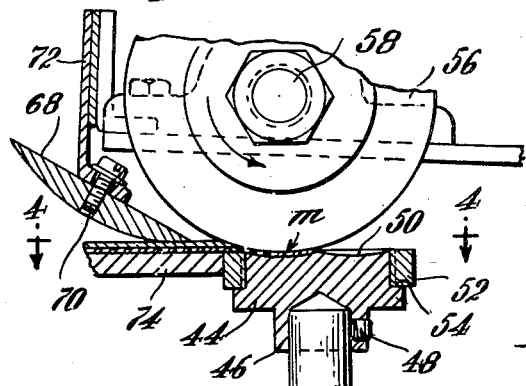
Fig. 3
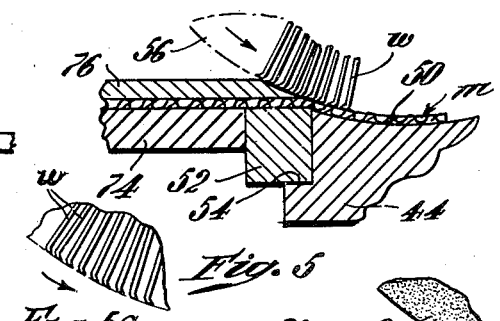
Fig. 5
Fig. 5a
Fig. 5c
Fig. 5b
Fig. 7
Fig. 6
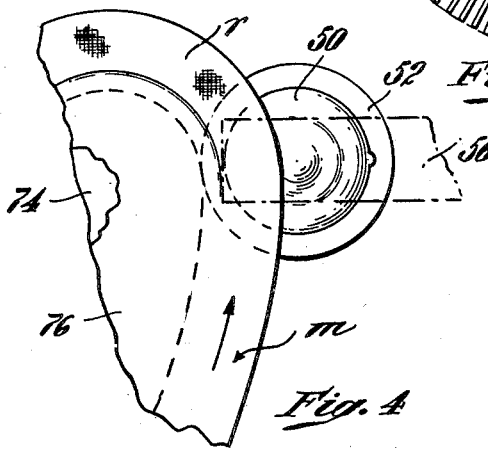
Fig. 4
Inventor
Walter W. Prue
by Roberts, Cushman & Grover
Attorneys United States Patent Office 2,840,835
Patented July 1, 1958

2,840,835

ROUGHING MACHINE

Walter W. Prue, Auburn, Maine

Application October 31, 1957, Serial No. 693,615

24 Claims. (Cl. 12—17)

This invention relates to a machine for use in the manufacture of shoes and more especially to roughing machines.

In the manufacture of certain kinds of shoes a flexible covering is applied to one side of an insole or platform and then its marginal edge is folded over the peripheral edge while under stress and secured to the opposite side. Before attaching the outsole it is necessary to rough the folded over marginal edge so that a good bond can be secured particularly when vinyl and vinyl-like materials are employed which have a smooth glossy surface to which adhesive does not readily adhere.

Objects of this invention are to provide means for roughing the surface of such coverings sufficiently to afford a good anchorage for the adhesive, to provide apparatus for roughing the surface along that part of the margin which is turned inwardly at the bottom of the insole or platform exclusively of the part covering the peripheral edge, to provide means for roughing the surface along a uniformly wide area so that there is a sharp well-defined line between the finished surface and the roughened surface, to provide means for controlling the width of the roughened area so as to leave enough of the finished surface adjacent thereto completely to cover the peripheral edge without any of the roughened area showing at the lower corner of the insole, and to provide means for roughing the covering after it is adhered to the insole or platform. Other objects are to provide means for roughing the surface in such a manner as to leave a smooth skived edge or an edge with a nap raised on it. Still other objects are to provide means with which the roughing can be accomplished rapidly, which does not require skilled operators, which is inexpensive to manufacture and is durable.

As herein illustrated the apparatus comprises a support having an edge against which an edge of the backing may be placed and a surface at an angle thereto upon which the marginal edge of the covering may rest while the edge of the backing is engaged with the edge of the support. The surface of the support contains a shallow groove which is transversely concave and an abrading element is arranged adjacent thereto so that a portion of it is concentric with the curvature of the groove and has contact with the marginal edge of the cover resting across the groove. There is means for moving the abrading element in a direction toward the edge of the support against which the edge of the backing rests to exert a stress on the margin which tends to pull the margin inwardly between the concentric portions of the abrading element and the support. The support is a circular disc which has associated therewith an annulus having a width corresponding substantially to the thickness of the bottom member being operated upon and which is replaceable by other annular of different thickness for bottom members of different thickness. The abrading element is in the form of a wheel, the peripheral edge of which is mounted on an axis above the support with its peripheral abrading surface concentric with the groove and may be a wire brush, a non-metallic brush or an emery wheel.

The invention will now be described in greater detail with reference to the accompanying drawings wherein:

Fig. 1 is a front elevation of the machine;

Fig. 2 is a side elevation of the machine as seen from the right-hand side of Fig. 1;

Fig. 3 is a fragmentary vertical section taken on the line 3—3 of Fig. 1, to much larger scale;

Fig. 4 is a fragmentary horizontal section taken on the line 4—4 of Fig. 3;

Fig. 5 is a fragmentary vertical section showing a wire brush with the ends of the wires inclined in a direction opposite to the direction of rotation;

Fig. 5a is a fragmentary vertical section of a wire brush with the ends of the wires inclined in a direction corresponding to the direction of rotation;

Fig. 5b is a fragmentary vertical section of a non-metallic brush;

Fig. 5c is a fragmentary vertical section of an emery wheel;

Fig. 6 is a plan view of a guard ring showing in dotted lines rings of smaller size; and Fig. 7 is a fragmentary vertical section through a portion of a finished bottom member.

Referring to the drawings, the machine has a frame comprised of spaced parallel plates 12, fastened at their lower edges to a web 14, by means of angles 16 and held in spaced relation by horizontal, transversely extending, vertically spaced braces 18, which also function to support bearings for a vertically disposed shaft 20. The lower end of the shaft 20 has mounted on it a worm 22 which engages a worm wheel 24 mounted on a horizontal, transversely extending shaft 26 journaled in bearings in the walls 12. A laterally extending portion of the shaft 26 has fast to it a pulley 27 adapted to receive one end of a belt 29, the opposite end of which is entrained about a pulley 23 fast to a horizontal shaft 25, journaled in the walls 12 rearwardly of the shaft 26. A pulley 28 is fast to the opposite end of the shaft 25. One end of a belt 33 is entrained about the pulley 28 and its other end is entrained about a pulley 32 fast to the drive shaft 34 of a motor M mounted on the table 36, by means of which the shaft 20 is rotated. The table 36 is pivoted at the rear upper corners of the walls 12 on pins 38 and has at its edges spaced parallel channel members 40 adapted to fit snugly over the upper ends of the walls to support the table against lateral movement. A coiled spring 42, connected at one end to the underside of the table 36 and at its other end to one of the walls, normally urges the table downwardly about its pivot pins for a reason which will appear hereinafter.

The upper end of the shaft 20 has mounted on it a disc 44 which has a neck 46 drilled to receive the shaft and a set screw 48 for securing it thereto. The upper surface of the disc 44 has an annular, radially concave groove 50 in it. Surrounding the disc there is a ring 52 which is removably seated on a radial shoulder 54 at the lower part of the disc with its upper surface at the level of the diametrical top surface of the disc, so that its flat upper surface forms a continuation of the top surface of the disc. The ring 52 is secured so as to turn with the disc by means of registering half-circular keyways in the ring and in the disc for reception of keys. Several such rings of different diameter are shown in Fig. 6 at 52, 52a and 52b.

A roughing wheel 56 is mounted on the table 36 on a horizontally disposed shaft 58 journaled for rotation in bearing blocks 60 fast to the table with its axis situated above the top surface of the disc 44, at right angles to a radius thereof, and in a plane perpendicular to and bisecting the radius. The radial distance between the axis of rotation of the shaft 58 and the concave surface of the annular groove 50 in the disc 44 corresponds substantially to the radius of curvature of the concavity of this groove, so that the periphery of the wheel 56 mounted on the shaft 58 is concentric with the concavity of the groove and turns in a plane parallel to a radius of the disc. The shaft 58 has fastened to it a pulley 62 over which one end of a belt 64 is entrained. The opposite end of the belt is entrained about a pulley 66 fastened to the opposite end of the motor shaft 34.

A combination guard and guide 68 is mounted on the forward end of the table 36 directly in front of the roughing wheel 56 so as to be between the operator and the roughing wheel for the purpose of preventing the operator from accidentally touching the wheel 56 while manipulating the work and to assist the operator in holding the work in the correct position. The guard is in the form of a disc having a convex lower surface and is mounted for free rotation on a bolt 70 which inclines downwardly and forwardly from the lower end of a bracket plate 72 fastened to the table so that the inner edge of the disc projects inwardly beneath the lower side of the wheel 56 adjacent the disc 44, with its curved surface substantially tangent to a plane spaced from the upper surface of the disc 44 by an amount substantially equal to the thickness of the covering material. This distance may be varied for different covering materials by adjustment of the plate 72.

In the use of the apparatus an insole or platform 74 (Fig. 7), having the covering material 76 adhesively applied to its upper surface with a margin $m$ extending beyond its peripheral edge all the way around which is wide enough to cover the peripheral edge and to be lasted inwardly over the bottom, is placed with the covered side up just beneath the combined guard and guide 68, so that the marginal edge of the insole bears against the outer surface of the ring 52 and the laterally projecting margin of the covering material is between the surface of the wheel 56 and the surface of the groove 50, as shown in Fig. 3. This may be done while the wheel and disc are in motion by a skillful operator without need for initially separating the wheel 56, that is, raising it from the surface of the disc 44 and once the margin is introduced the insole is merely supported and allowed to turn peripherally with respect to the disc 44 and wheel 56 by the linear feeding motion imparted to its edge by the rotating disc 44. The insole is held in contact with the edge of the disc 44 by the inwardly directed force imparted to the marginal edge by the rotation of the wheel 56 in a direction inwardly from the edge of the disc 44 toward its center. The guard 68 helps to locate the bottom and to guide it during movement and also prevents the operator from accidentally touching the wheel 56. By reason of the concavity of the groove 50 it is at once apparent that the peripheral edge of the wheel 56 will roughen an area $r$ of uniform width marginally of the covering and that by choosing a ring 52 of suitable radial thickness the amount of covering necessary to cover the peripheral edge of the sole may be preserved intact. A ring is chosen whose width corresponds substantially to the edge thickness of the insole to be covered.

To facilitate removing the ring 52 and replacing it it is necessary to elevate the table 36 to lift the wheel 56 away from the disc 44. Accordingly, a lever 80 is mounted on one wall of the housing on a pivot pin 82. One end of the lever has a roller 84 on it which bears against the underside of the one of the channels 40 at that side and the other has a handle 86. By rocking the lever 80 downwardly to the dotted line position the roller 84 may be caused to elevate the table 36 sufficiently to permit removing a ring 52 and replacing it with another. The handle contains a pin 87, which may be engaged with a hole 87.5 to hold the table elevated in opposition to the downward pull of the spring 42.

Various covering materials require varying degrees of roughing and under certain circumstances a wire brush is found desirable and under others a non-metallic brush or an emery wheel. If it is desirable to remove the glossy surface of a vinyl cover a wire brush is employed in which the ends of the wires $w$, as shown in Fig. 5, are ground so as to be inclined in a direction opposite to the direction of rotation of the brush. As thus ground the brush merely scuffs or rubs the surface of the covering material off and if the latter is fabric-backed down to the fabric, depending upon the setting or spacing of the wheel and disk. The spacing between the wheel and disk is controlled by a hand screw 86.5 threaded through a boss 88 on the table 36 so that its lower end bears against a block 90 on the frame. If it is desirable not only to roughen the surface but to raise a nap the wires of the brush are ground so that the incline in the opposite direction, that is, in the direction of rotation (Fig. 5a), hence as they move over the margin they catch and pull the fibers so as to raise a nap. In some cases it is only necessary to remove the gloss at the surface and this may be accomplished by a non-metallic brush $b$ (Fig. 5b) rotating at fairly high speed so that in effect it burns the surface gloss off. In other cases an emery wheel $e$ (Fig. 5c) may be employed to advantage. While vinyls are specifically mentioned it is to be understood that the apparatus may be used for abrading and roughing the surface of any covering material employed and that it is only necessary to select an abrading wheel which is suitable for the particular surface to be roughened.

Since the abrading action results in a large quantity of dust which must be removed from the vicinity of the machine an exhaust duct 92 is fastened to the rear end of the frame to carry off the dust. The frame may be provided with baffles or the like enclosures to conduct the dust rearwardly into the exhaust duct.

It should be understood that the present disclosure is for the purpose of illustration only and that this invention includes all modifications and equivalents which fall within the scope of the appended claims.

I claim:

1. Apparatus for roughing the margin of a flexible cover attached to one side of a rigid backing with its margin extending laterally therefrom, comprising a support having an edge against which an edge of the backing may be placed and a surface at an angle thereto upon which the margin of the covering may rest while the edge of the backing is engaged with the edge of the support, said surface containing a shallow groove which is transversely concave and an abrading element arranged so that a portion of it is concentric with the curvature of the groove and has contact with the margin of the cover resting across the groove, and means for moving the abrading element in a direction toward the edge of the support against which the edge of the backing rests to exert a stress on the margin which tends to pull said margin inwardly between the concentric portions of the abrading element and the support, said backing being movable relative to the support during such movement of the abrading element to present successive portions of the margin lengthwise of the backing to the abrading element.

2. Apparatus for roughing the marginal edge of a flexible cover attached to one side of a bottom element with its margin extending laterally from the element, comprising a circular support movable about its center, said support having a peripheral edge against which an edge of a bottom element may be advanced linearly around its entire periphery and a diametrical surface upon which the marginal portion of the cover rests when the bottom is held up to the support with its edge engaged therewith, said diametrical surface containing an annular depression concentric with its center of rotation which is concave in transverse section and an abrading wheel having a peripheral edge corresponding in radius of curvature to the radius of curvature of the depression, mounted with its edge concentric with the depression so as to have contact with the margin of the cover engaged with the support to press it into the depression, means for driving the abrading wheel in a direction to exert an inwardly directed abrading force on the margin sandwiched between it and the support and means for turning the support in a direction to assist in advancing the bottom peripherally.

3. Apparatus for roughing the marginal edge of a flexible covering attached to one side of a bottom element with its margin extending laterally from the edge, comprising a rigid disk mounted for rotation about its center, said disk having a peripheral edge against which the edge of the bottom element may be turned and a diametrical surface containing an annular groove of concave transverse section concentric with its center upon which the margin of the cover is adapted to rest when the edge of the bottom element is held against the edge of the support, a wheel having a peripheral abrading surface which corresponds in radius of curvature to the radius of curvature of the transverse section of the groove, means mounting the wheel with its peripheral surface concentric with the concave surface of the groove, means for turning the wheel in a direction such that its surface moves inwardly with respect to the edge of the disk and means for turning the disk.

4. Apparatus for roughing the marginal edge of a flexible cover attached to one side of a rigid backing with its margin extending laterally from the edge, comprising a rigid disk mounted to turn about its center, said disk having a peripheral edge and a diametrical surface, the latter having in it an annular depression which in transverse cross-section is concave, a wheel having a peripheral abrading edge which corresponds in curvature to the concavity of the depression, means mounting the wheel in a plane perpendicular to the plane of the diametrical surface of the disk, and on a radius thereof, with its peripheral surface substantially concentric with the depression, means for rotating the wheel in a direction such that its surface moves inwardly with respect to the edge of the disk, and means for rotating the disk.

5. Apparatus for roughing the marginal edge of a flexible covering attached to one side of a rigid backing element with its marignal edge extending laterally therefrom, comprising a rigid disk mounted to turn about its center, said disk having a peripheral edge and a diametrical surface, the latter having in it an annular depression which in transverse cross-section is concave and an annular flat surface exteriorly thereof, an abrading wheel having a peripheral edge which corresponds in curvature to the concavity of the depression, means mounting the wheel in a plane perpendicular to the plane of the diametrical surface of the disk and on a radius thereof, with its peripheral surface substantially concentric with the depression, means for rotating the wheel in a direction such that its surface moves inwardly with respect to said disk and means for rotating the disk.

6. Apparatus for roughing the marginal edge of a flexible covering attached to one side of a rigid element with its margin extending laterally therefrom, comprising a rigid disk mounted to turn about a center, said disk having a peripheral edge against which an edge of the element may be held, and a diametrical surface upon which the margin may rest, the latter having in it an annular depression which in transverse cross-section is concave, and an annular flat surface circumscribing said annular concave surface across which the margin extends, a wheel having a peripheral abrading edge which corresponds in curvature to the concavity of the depression, means mounting the wheel in a plane perpendicular to the plane of the diametrical surface of the disk and on a radius thereof with its peripheral surface substantially concentric with the depression and in contact with the marginal edge of the covering spanning the groove, means for rotating the wheel in such a direction that its surface moves from the edge of the disk toward its center and means for turning the disk.

7. Apparatus according to claim 6, wherein the radial width of the annular flat surface corresponds substantially to the thickness of the peripheral edge of the rigid element.

8. Apparatus for roughing the marginal edge of a flexible covering attached to one side of a rigd backing with its margin extending laterally therefrom, comprising a rigid disk mounted to turn about its center, said disk having a peripheral edge and a diametrical surface, the latter having in it an annular depression which in transverse cross-section is concave, an annulus circumscribing said disk having a flat diametrical surface forming a radial extension of the disk, an abrading wheel having a peripheral edge which corresponds in curvature to the concavity of the depression, means mounting the wheel in a plane perpendicular to the plane of the diametrical surface of the disk and on a radius thereof, with its peripheral surface substantially concentric with the depression, means for rotating the wheel in such a direction that its surface moves toward the edge of the disk and means for turning the disk.

9. Apparatus for roughing the marginal edge of a flexible wrapper attached to one side of a rigid backing with its edge extending laterally therefrom for folding about said edge, comprising a rigid disk mounted to turn about its center, said disk having a peripheral edge and diametrical surface, the latter having in it an annular depression which in transverse section is concave, annuli adapted replaceably to be associated with the disk to turn with it, said annuli having flat diametrical surfaces circumscribing the annular concave depression, the radial width of the surface of an annulus associated with the disk at any given time being substantially equal to the thickness of the backing, an abrading wheel having a peripheral edge corresponding in curvature to the concavity of the depression, means mounting the wheel in a plane perpendicular to the plane of the diametrical surface of the disk and on a radius thereof with its peripheral surface substantially concentric with the depression, means for turning the wheel in a direction such that its surface moves from the edge of the disk inwardly toward its center, and means for turning the disk.

10. Apparatus for roughing a marginal edge of a flexible wrapper attached to one side of a rigid backing with its edge extending laterally therefrom, comprising a rigid disk mounted to turn about its center, said disk having a peripheral edge and a diametrical surface, the later having in it an annular depression which in transverse section is concave, an abrading wheel having a peripheral edge which corresponds in curvature to the curvature of the depression, means mounting the wheel in a plane perpendicular to the plane of the diametrical surface of the disk, and on a radius thereof with its peripheral surface substantially concentric with the depression, a guide disposed adjacent the peripheral surface of the wheel at the side which is moving inwardly with respect to the edge of the disk for engagement with the top of the covered backing when its edge is held against the peripheral edge of the disk, means for turning the wheel in a direction such that its surfaces moves inwardly with respect to the edge of the disk and means for turning the disk for advancing the backing linearly.

11. Apparatus for roughing the marginal edge of a flexible wrapper attached to one side of a rigid backing with its edge extending laterally therefrom, comprising a rigid disk mounted to turn about its center, said disk having a peripheral edge and a diametrical surface, the latter having in it an annular depression which in transverse section is concave, an abrading wheel having a peripheral edge which corresponds in curvature to the curvature of the depression, means mounting the wheel in a plane perpendicular to the plane of the diametrical surface of the disk, and on a radius thereof, with its peripheral surface substantially concentric with the depression, and a guide disposed adjacent the inwardly moving side of the wheel having a work contacting surface situated above the plane of the disk by an amount corresponding substantially to the thickness of the backing plus the thickness of the wrapper attached thereto.

12. Apparatus for roughing the marginal edge of a flexible covering attached to one side of a rigid panel with its edge extending laterally therefrom, comprising a rigid disk mounted to turn about its center, said disk having a peripheral edge and a diametrical surface, the latter having in it an annular depression which in transverse section is concave, an abrading wheel having a peripheral edge which corresponds in curvature to the curvature of the depression, means mounting the wheel in a plane perpendicular to the plane of the diametrical surface of the disk, and on a radius thereof, with its peripheral surface substantially concentric with the depression, and a guide disk mounted on the wheel support, said guide disk having an edge situated at the ingoing side of the wheel adjacent the supporting disk for limiting the heightwise position of the work.

13. Apparatus for roughing the marginal edge of a flexible covering attached to one side of a rigid panel with its edge extending laterally therefrom, comprising a rigid disk mounted to turn about its center, said disk having a peripheral edge and a diametrical surface, the latter having in it an annular depression which in transverse section is concave, an abrading wheel having a peripheral edge which corresponds in curvature to the curvature of the depression, means mounting the wheel in a plane perpendicular to the plane of the diametrical surface of the disk, and on a radius thereof, with its peripheral surface substantially concentric with the depression, a guide disk mounted on the wheel support, said guide disk having an edge situated at the ingoing side of the wheel adjacent the top of the support disk for limiting the heightwise position of the work, said disk being free to turn about its center as the work is advanced peripherally with respect to the edge of the supporting disk.

14. Apparatus for roughing the marginal edge of a flexible covering attached to one side of a rigid panel with its edge extending laterally therefrom, comprising a rigid disk mounted to turn about its center, said disk having a peripheral edge and a diametrical surface, the latter having in it an annular depression which in transverse section is concave, an abrading wheel having a peripheral edge which corresponds in curvature to the curvature of the depression, means mounting the wheel in a plane perpendicular to the plane of the diametrical surface of the disk, and on a radius thereof, with its peripheral surface substantially concentric with the depression, a guide disk mounted on the wheel support, said guide disk having a downwardly facing conical surface, the edge of which is situated close to the disk at the ingoing side of the wheel, for limiting the heightwise position of the work, said disk being rotatable about an inclined axis so that its edge remains substantially parallel to the surface of the disk while rotating.

15. Apparatus according to claim 1, wherein the abrading element is a circular wire brush.

16. Apparatus according to claim 1, wherein the abrading element is a circular wire brush having the ends of its bristles ground at an angle so that the end face of each wire is inclined with respect to its longitudinal axis.

17. Apparatus according to claim 1, wherein the abrading element is a circular wire brush having the ends of the bristles ground at an angle so that the end face of each wire is inclined with respect to its longitudinal axis in the direction of rotation.

18. Apparatus according to claim 1, wherein the abrading element is a circular wire brush having the ends of its bristles ground at an angle so that the end face of each wire is inclined with respect to its longitudinal axis in a direction opposite to the direction of rotation of the brush.

19. Apparatus according to claim 1, wherein the abrading element is a non-metallic circular brush.

20. Apparatus according to claim 1, wherein the abrading element is a circular emery stone.

21. Apparatus according to claim 1, wherein the wheel is yieldingly biased toward the disk.

22. Apparatus according to claim 1, wherein the wheel is yieldingly biased toward the disk and there is means for adjustably holding the wheel and disk at a given spacing.

23. Apparatus according to claim 1, wherein the wheel is yieldingly biased toward the disk and there is means operable to raise the wheel away from the disk and to hold it supported in said inoperative position.

24. Apparatus according to claim 1, wherein there is exhaust means for collecting and conveying away the trash resulting from said abrading operation.

No references cited.